United States Patent Office 2,831,877
Patented Apr. 22, 1958

2,831,877

PRODUCTION OF CARBOXYLIC ACIDS FROM OLEFINS

Herbert Koch, Mulheim an der Ruhr, Germany, assignor to Studiengesellschaft Kohle mit beschrankter Haftung, Mulheim an der Ruhr, Germany, a German corporation No Drawing. Application March 17, 1953
Serial No. 342,961

Claims priority, application Germany March 24, 1952

17 Claims. (Cl. 260—413)

This invention relates to improvements in the production of carboxylic acids from olefins.

The production of fatty acids by high-pressure synthesis from olefins, carbon monoxide and water in the presence of a variety of catalysts has been known for some time in the past. Articles have been written and numerous patents have been granted for various embodiments of this process.

A comprehensive statement of this process is set forth in R. F. Goldstein's monograph, "The Petroleum Chemicals Industry," New York and London, 1950, page 187, where it is stated:

"Another important synthesis based on carbon monoxide is the direct production of acids by a reaction between olefins, water and carbon monoxide, a reaction which has been developed by Du Pont (U. S. Patent 1,924,766 and many later patents). This is another high pressure reaction which is carried out at substantially higher temperatures than the Oxo-synthesis. The usual conditions are 200–1000 atmospheres at 300–400° C.; an acid catalyst is required which necessitates the use of materials which are resistant to high pressure and corrosive influences. In fact silver and silver alloys have been patented for this purpose. The catalysts proposed include phosphoric acid, hydrochloric acid, sulphuric acid, boron trifluoride etc. Ethylene reacts readily to give propionic acid. Propylene gives isobutyric acid. 2-butene undergoes a re-arrangement in the carbon chain to give trimethylacetic acid:

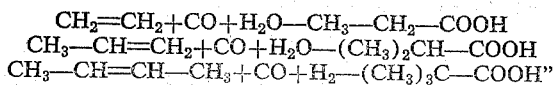

$$CH_2=CH_2+CO+H_2O \longrightarrow CH_3-CH_2-COOH$$
$$CH_3-CH=CH_2+CO+H_2O \longrightarrow (CH_3)_2CH-COOH$$
$$CH_3-CH=CH-CH_3+CO+H_2 \longrightarrow (CH_3)_3C-COOH"$$

In spite of the numerous patents granted relating to this synthesis, the same has never been adopted in practice, although it would appear to be the simplest method of synthesizing fatty acids. The reason this synthesis has never been adopted is most probably due to the strongly corrosive action of the acid catalyst proposed under the necessarily severe conditions of pressure and temperature, and these conditions themselves.

One object of this invention is the production of carboxylic acids from olefins without the above-mentioned disadvantages. This, and still further objects, will become apparent from the following description:

It has now surprisingly been found that the synthesis of carboxylic acids can be carried out under conditions which are substantially milder and therefore more suitable in practice by reacting the olefins and carbon monoxide in the liquid phase without addition of water and in the presence of acid catalysts which contain little water and which may, if desired, even be anhydrous, and only then taking the reaction product up in water. As shown by the above equations, one mol of water is required per one mol of olefin and one mol of carbon monoxide to carry out the conversion into carboxylic acid. It is therefore astonishing that the reaction should take place particularly well in the presence of catalysts having a pronounced dehydrating action, when initially there is either no water present or only so much water as corresponds to the stoichiometric proportions. A possible explanation is that in the first place mixed inorganic-organic hydrides, for example, fluorides or mixed anhydrides of carboxylic acids and sulfuric acid are preferentially formed. When the reaction product is taken up in water, these anhydrides give the desired carboxylic acids.

The reaction according to the invention has a wide application. Thus, aliphatic olefins such as ethylene, propene, butene, isobutene or higher molecular weight olefins such as nonene, hexadecene and the like, and mixtures thereof, as, for example, the olefin-rich products of the Fischer-Tropsch synthesis carried out under moderate pressure in the presence of ion catalysts, can be used as starting materials. The reaction can also be applied to cyclic olefins, such as cyclohexene, and also to diolefins, as, for example, butadiene and 4-vinylcyclohexene-1 and in general to olefinic compounds such as unsaturated carboxylic acids, for example, oleic acid.

It is advantageous to carry out the reaction in such a manner that the olefins first contact the catalysts in the presence of carbon monoxide. Preferably the olefins are only introduced when the catalyst and the catalyst space have been saturated with carbon monoxide. If olefins are first introduced into the catalyst, for example, into concentrated sulfuric acid, then the reaction generally takes place with a substantially lower yield of the desired acids.

It is preferable to employ as catalysts in accordance with the invention anhydrous hydrogen fluoride, if desired, with addition of boron fluoride or concentrated sulfuric acid. For this purpose 100% sulfuric acid can be used, i. e., in the complete absence of water, which is very surprising. Insofar as aqueous sulfuric acid is employed, it must have a strength of at least 90%, preferably 96%. This is astonishing, since it was regarded as advantageous in the known process to work with 70–80% sulfuric acid in spite of the use of water as a reaction component.

Besides the catalysts mentioned above there may also be used chlorosulfonic acid and fluorosulfonic acid.

The reaction according to the invention can be carried out at ordinary temperature and ordinary pressure. In many cases it is even advantageous to cool the reaction to 0° C. and lower. In other cases heating is advantageous, but temperatures of 100° C. need not be exceeded, in contradistinction to the known process in which temperatures of approximately 300–400° C. were employed. In carrying out the reaction with sulphuric acid, it is advantageous to work at temperatures of approximately $-30°$ C. to $+50°$ C.

The position is similar with regard to pressure. It is often advantageous to work under increased pressure. This pressure, however, need never exceed 100 atmospheres. The most favorable results are obtained at 20–50 atmospheres. It is possible to use pressures about 100 atmospheres, for instance 200 or 500 atmospheres or more, but in spite of these extreme conditions, there are not obtained more favorable results. It was already mentioned above that increased pressures are neither necessary nor characteristic in the reaction according to the invention.

The reaction product obtained is taken up in water, whereupon the carboxylic acid formed floats on the surface and can often be separated as such. In other cases it is advantageous to separate the carboxylic acid from admixture with water and other reaction products by steam distillation or extraction. The reaction products obtained are taken up in water in such a quantity that the concentration of the sulphuric acid or the hydrofluoric acid respectively only is still about 30-40%. The hydrolysis of the compounds which are obtained as a first step of the carboxylic acids will then be completed by heating the aqueous solution up to the boiling point. In case the carboxylic acids obtained are still sufficiently steam-volatile substances, a steam distillation will follow. The organic acids led over will be separated from the neutral compounds accompanying them by means of caustic soda. They will then be liberated from the soap suds by acidifying them, for instance with sulphuric acid. The carboxylic acids may eventually also be separated from the neutral substances by means of fractionated distillation.

In case the carboxylic acids obtained are not volatile by steam, they are separated from the diluted mineral acid after hydrolysis and are distilled either with superheated steam or in vacuum.

Generally it can be said that the reaction products can be worked up in a manner well known to those in the art. It is the same with the regeneration of the sulphuric acid or the hydrofluoric acid respectively used as catalysts.

The reaction set out in the above equations can be regarded formally as the addition to an olefin of formic acid formed from carbon monoxide and water. It should accordingly be possible to carry out the reaction with formic acid instead of with carbon monoxide and water. Experiments have shown that this is in fact possible. According to a modification of the process of the invention, the olefins can be introduced directly into a mixture of formic acid and concentrated sulfuric acid or hydrogen fluoride, whereby carboxylic acid is obtained.

The V4A-Extra autoclaves mentioned in the following examples are produced from an austenitic chromium nickel steel with about 18% chromium and 10% nickel as well as 2% molybdenum plus titanium. This material is distinguished by especially great resistance to rust and acids.

The following examples are given by way of illustration and not limitation:

*Example 1*

49 gm. of gaseous isobutene mixed with gaseous carbon monoxide were introduced at 0° C. and normal pressure into 106 cc. (2 mols) of 97% sulfuric acid in the course of 7 hours. The experiment was carried out in a closed flask with intensive stirring. 23 gm. of carboxylic acids, including 14 gm. of trimethylacetic acid, were obtained, together with 23 gm. of other products.

*Example 2*

In order to study the influence of pressure, 120–130 gm. of propene (about 3 mols) were introduced into a 2-liter autoclave with magnetic stirring, in which 500 cc. (9.5 mols) of 97% sulfuric acid were already present and which was maintained under a predetermined pressure of carbon monoxide. The propene was forced in in the course of an hour with an injection pump. The temperature was 5–10° C., and the total experimental period approximately 15 hours. The results obtained in dependence on the carbon monoxide pressure are shown in the following table:

| Carbon monoxide pressure, Atmospheres | Isobutyric acid obtained, Mol |
|---|---|
| 20–25 | 1.1 |
| 50 | 1.6 |
| 100 | 1.7 |

These results show that an increase of pressure above 50 atmospheres leads to substantially no improvement in the yield of isobutyric acid.

In order to study the influence of the concentration of sulfuric acid, the experiment was repeated at 50 atmospheres with 89%, 92% and 95% sulfuric acid on the one hand and with 100% sulfuric acid on the other hand. The results of this experiment with different sulfuric acid concentrations are shown in the following table:

| Sulfuric acid concentration, percent | Isobutyric acid obtained, Mol |
|---|---|
| 89 | 0.1 |
| 92 | 0.25 |
| 95 | 0.6 |
| 97 | 1.6 |
| 100 | 1.3 |

These experiments show that a reduction of the sulfuric acid concentration even to 95% causes a substantial reduction in the yield, while the increase of concentration up to the anhydrous condition is associated with no substantial reduction in the yield.

A further experiment showed that an increase in the yield of fatty acid can be obtained by using particularly low temperatures during the introduction of the propene. 2 mols of propene were forced in per 10 mols of 97% sulfuric acid at −25° C. and a carbon monoxide pressure of 50 atmospheres, and thereafter the temperature was increased over the course of 20 hours to 15° C. Working up gave 1.8 mols of isobutyric acid, i. e., 90% of the theoretical.

*Example 3*

Carbon monoxide was forced in up to a pressure of 25 atmospheres into 20 gm. of hydrogen fluoride into an iron autoclave of 400 cc. content lined with sheet silver. In the course of 4 hours 28 gm. (0.5 mol) of isobutene were forced in in small portions. The experimental temperature was 20°–30° C. and the experimental pressure 25–35 atmospheres. 18 gm. of fatty acids were obtained, consisting of 13 gm. of trimethylacetic acid and 5 gm. of carboxylic acids of higher molecular weight. In addition, 13 gm. of a neutral oil were obtained.

*Example 4*

170 gm. (3 mols) of isobutene were introduced into a 2-liter (V4A-Extra) autoclave with magnetic stirring in which 500 cc. (9.5 mols) of 97% sulfuric acid were present and in which a carbon monoxide pressure of 50 atmospheres was maintained. The experimental temperature was 5–10° C. and the experimental period 4.5 hours. 161 gm. (1.4 mols) of acids, consisting substantially of trimethylacetic acid, were obtained. In addition, 44 gm. of neutral oil were obtained.

*Example 5*

40 gm. (1.5 mols) of ethylene were forced little by little into a 400 cc. iron autoclave lined with sheet silver, in which 85 gm. (4 mols) of hydrofluoric acid and 21 gm. (⅓ mol) of borontrifluoride were present and a carbon monoxide pressure of 30 atmospheres prevailed. The experimental temperature was 20–30° C., the experimental pressure 30–60 atmospheres, and the experimental period 5 hours. 22 gm. of propionic acid were obtained, together with 20 gm. of ethylfluoride and 14 gm. of nonacids.

Example 6

50 gm. of 2-ethyl-hexene-1 and 40 gm. of n-hexane as diluent were introduced into a 0.5 liter shaking autoclave of V4A-Extra steel, in which 200 cc. of 97% sulfuric acid were present, and a carbon monoxide pressure of 40 atmospheres prevailed. The experimental temperature was 20° C., the experimental pressure 40 atmospheres, and the experimental period 4 hours. 43 gm. of carboxylic acid were obtained.

Example 7

(a) 1400 gm. of an olefin-paraffin mixture containing 52% olefins were introduced by means of a compression pump into a V4A-Extra autoclave of 5-liter content with magnetic stirring in which 2 liters of 97.6% sulfuric acid were present and a carbon monoxide pressure of 50 atmospheres prevailed. This mixture represented a $C_5$ cut from the product of the Fischer-Tropsch synthesis carried out at moderate pressure in the presence of iron catalysts. The experimental temperature was 8° C. and the experimental period 20 hours. The fall in pressure which took place from the beginning of the injection was compensated by forcing in more carbon monoxide so that a pressure of 50 atmospheres always prevailed. 635 gm. of fatty acids, 84% of which consisted of $C_5$ acids, were obtained together with 100 gm. of neutral organic oxygen compounds.

(b) Pure pentene-1 diluted with n-pentane in the proportion 1:1 were reacted in a further experiment in place of the pentene-pentane mixture. 100 mols. of 97.5% sulfuric acid were employed per mol of pentene-1 and the temperature was kept at —10 to —3° C. while the carbon monoxide pressure was again 50 atmospheres. Working up gave a yield of fatty acids corresponding to 94% of the theoretical calculated on the pentene-1 introduced. 97% was established by fine fractionation to be a mixture of $C_6$ acids, diethylacetic acid and methyl-n-propylacetic acid.

Example 8

490 gm. of a $C_{12}$ cut containing 60% of olefins derived from the Fischer-Tropsch synthesis were forced into a 2-liter stirring autoclave which contained 0.5 liter of 97% sulfuric acid. During the experimental period of 15 hours the carbon monoxide pressure was 50 atmospheres and the temperature 4–10° C. On working up 290 gm. of carboxylic acid, mainly tridecane acids were obtained, which corresponds to a yield of 77% of the theoretical.

Example 9

328 gm. of cyclohexene diluted with 350 cc. n-hexane, were injected into a V4A-Extra autoclave of 2-liter content with magnetic stirring in which 400 cc. of 97% sulfuric acid were present and a carbon monoxide pressure of 50 atmospheres prevailed. The experimental temperature during the injection was 4–10° C. and finally rose to 20° C. After an experimental period of 20 hours, 162 gm. of $C_7$ acids were isolated on working up, representing a mixture of 40% methylcyclopentane and 60% of cyclohexane carboxylic acid.

Example 10

42 gm. of oleic acid diluted with the same volume of n-hexane were injected at room temperature into a shaking autoclave of 0.5 liter content which contained 200 cc. of 97% sulfuric acid and was under a pressure of 45 atmospheres of carbon monoxide. After shaking for 12 hours, the reaction product was worked up and a $C_{19}$ dicarboxylic acid was obtained therefrom in a yield of 83%.

Example 11

68 gm. (1.2 mols) of isobutene were introduced into a mixture of 48 cc. (1 mol) 97% formic acid and 106 cc. (2 mols) of 97% sulfuric acid. The reaction was carried out in a glass flask with intensive stirring at 20° C. and normal pressure. After 4 hours, 34 gm. of acids, predominantly with 5 carbon atoms, and 48 gm. of noncarbon acids were isolated from the reaction product.

The reaction of the olefinic compounds and the carbon monoxide without the addition of water will be referred to as the reaction under substantially anhydrous conditions. The catalyst, which contains little or no water, as, for example, the sulfuric acid for at least 90% concentration, will be referred to as a substantially water-free catalyst.

Example 12

140 gm. (3.4 mols) of propene were forced into a 2-liter V4A-Extra autoclave with magnetic stirring in which 1150 gm. (10 mols) of chlorosulfonic acid were present and where a carbon monoxide pressure of 50 atmospheres prevailed. The temperature during the time of 15 hours was 4–12° C. On working up by means of dilution with 2 liters of water and following steam distillation, there were obtained 55 gm. (0.6 mol) of iso butyric acid.

I claim:

1. Process for the production of carboxylic acids, which comprises contacting an olefinic compound and carbon monoxide in liquid phase under substantially anhydrous conditions in the presence of a substantially water-free acid catalyst selected from the group consisting of sulfuric acid of at least 90% strength, anhydrous hydrogen fluoride, anhydrous chlorosulfonic acid and anhydrous hydrogen fluoride with the addition of boron fluoride, and thereafter adding water to the reaction mixture formed, and recovering the carboxylic acid.

2. Process according to claim 1, in which said contacting is effected by adding the olefinic compound to the carbon monoxide and catalyst.

3. Process according to claim 1, in which said olefinic compound is an aliphatic olefin.

4. Process according to claim 1, in which said olefinic compound is a mixture of aliphatic olefins obtained by the catalytic hydrogenation of carbon monoxide in the presence of iron catalyst.

5. Process according to claim 1, in which said olefinic compound is a cyclic olefin.

6. Process according to claim 1, in which said olefinic compound is a di-olefin.

7. Process according to claim 1, in which said catalyst is an anhydrous catalyst.

8. Process according to claim 1, in which said contacting is effected at a temperature between 0 and 100° C.

9. Process according to claim 1, in which said contacting is effected under pressure of up to 100 atmospheres.

10. Process according to claim 1, in which said contacting is effected under pressure of about 20–50 atmospheres.

11. Process according to claim 1, in which said carboxylic acid is recovered by steam distillation.

12. Process according to claim 1, in which said carboxylic acid is recovered by extraction.

13. Process according to claim 1, in which said catalyst is sulfuric acid of at least 90% concentration.

14. Process according to claim 1, in which said catalyst is anhydrous hydrogen fluoride.

15. Process according to claim 1, in which said contacting is effected in the additional presence of borontrifluoride.

16. Process for the production of carboxylic acids which comprises contacting an olefinic compound with a member selected from the group consisting of carbon monoxide and formic acid under substantially anhydrous conditions in the liquid phase in the presence of a substantially water-free acid catalyst selected from the group consisting of sulfuric acid of at least 90% strength, anhydrous hydrogen fluoride, anhydrous chlorosulfonic acid and anhydrous hydrogen fluoride with the addition of boron trifluoride, thereafter adding water to the reaction mixture formed, and recovering a carboxylic acid.

17. Process for the production of carboxylic acid which comprises contacting olefinic compounds with formic acid under substantially anhydrous conditions in the liquid phase in the presence of a substantially water-free acid catalyst selected from the group consisting of sulfuric acid of at least 90% strength, anhydrous hydrogen fluoride, anhydrous chlorosulfonic acid and anhydrous hydrogen fluoride with the addition of boron trifluoride and thereafter adding water to the reaction mixture formed, and recovering a carboxylic acid.

References Cited in the file of this patent

UNITED STATES PATENTS

| | | |
|---|---|---|
| 1,973,662 | Schalch | Sept. 11, 1934 |
| 2,759,953 | Knight et al. | Aug. 21, 1956 |

OTHER REFERENCES

Acetylene Chemistry, P. B. Report 18852–s, 1949, pages 162–165, 187–189.

UNITED STATES PATENT OFFICE

Certificate of Correction

Patent No. 2,831,877     April 22, 1958

Herbert Koch

It is hereby certified that error appears in the printed specification of the above numbered patent requiring correction and that the said Letters Patent should read as corrected below.

Column 1, lines 45 and 46, for "$H_2O$—", each occurrence, read —$H_2O$———; line 47, for "$H_2$—$(CH_3)_3C$—" read —$H_2O$———$(CH_3)_3C$——; column 2, line 25, for "ion" read —iron—; column 3, line 4, for "about" read —above—; column 6, line 69, for the claim reference numeral "1" read —14—.

Signed and sealed this 15th day of July 1958.

[SEAL]

Attest:
KARL H. AXLINE,
*Attesting Officer.*

ROBERT C. WATSON,
*Commissioner of Patents.*